Figure 1:
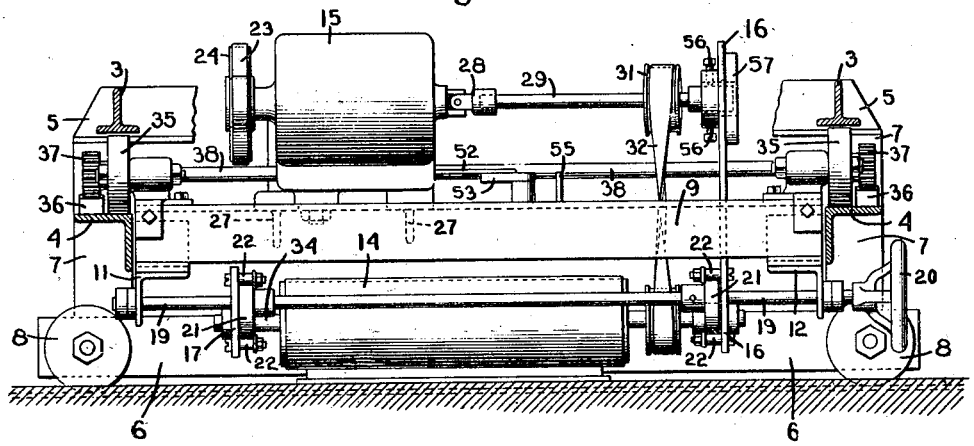

H. D. GARBER.
MACHINE FOR TRIMMING HEELS AND SIMILAR ARTICLES.
APPLICATION FILED AUG. 16, 1915.

1,208,944.

Patented Dec. 19, 1916.
2 SHEETS—SHEET 1.

Inventor
Harry D. Garber
by Heard Smith & Tennant.
Att'ys

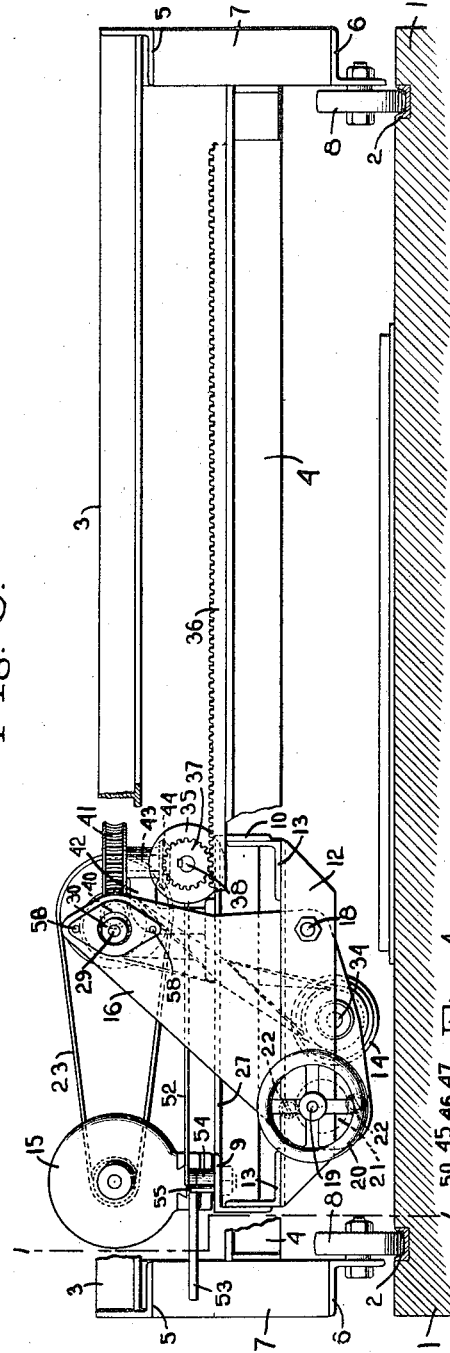
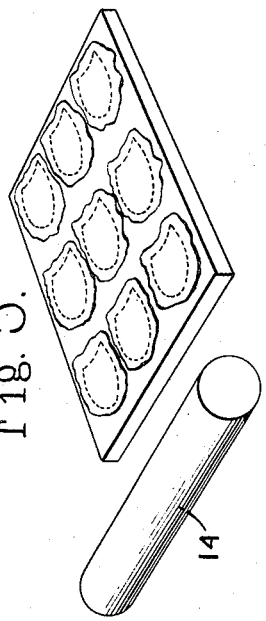
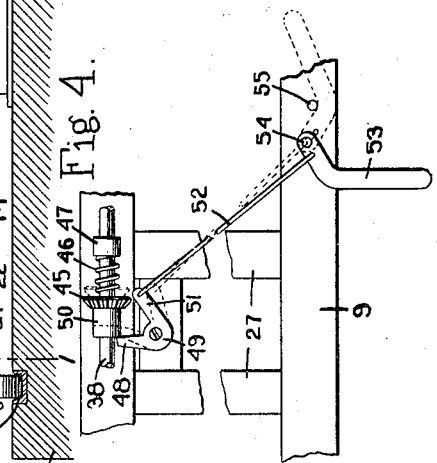

UNITED STATES PATENT OFFICE.

HARRY D. GARBER, OF STOUGHTON, MASSACHUSETTS, ASSIGNOR TO PLYMOUTH RUBBER COMPANY, OF CANTON, MASSACHUSETTS, A CORPORATION OF MASSACHUSETTS.

MACHINE FOR TRIMMING HEELS AND SIMILAR ARTICLES.

1,208,944. Specification of Letters Patent. Patented Dec. 19, 1916.

Application filed August 16, 1915. Serial No. 45,737.

*To all whom it may concern:*

Be it known that I, HARRY D. GARBER, a citizen of the United States, and resident of Stoughton, county of Norfolk, and State of Massachusetts, have invented an Improvement in Machines for Trimming Heels and Similar Articles, of which the following description, in connection with the accompanying drawing, is a specification, like characters on the drawing representing like parts.

This invention relates to an improvement in machines for trimming heels and similar articles.

In the manufacture of the usual rubber or composition heels, soles and similar articles, the formative material in more or less plastic state is placed within molds or dies in which it is allowed to harden with or without pressure.

The apparatus which is the subject of this invention is employed to treat such articles while in the molds when set or hardened. The molds consist of a block containing a plurality of cavities of the desired shape and several of such molds are placed upon a table upon which this mechanism travels. This machine has a wheeled structure adapted to travel and to be positioned at any point of the length of the table. This structure bears a carriage mounted thereon and actuable to traverse the table at right angles to the movement of the wheeled structure. In filling the mold cavities, the material runs over the adjacent surface of the mold and it is then necessary to trim the top of the formed heel, sole or similar article so that it may present a finished and merchantable appearance. This surplus material is trimmed from the articles in the molds by a roller borne by the carriage. This carriage is power-driven so that it traverses the plurality of molds on the table while the roller frictionally bears upon the mold surface and, having a relatively reverse motion, it functions to remove the surplus material from the particular article which projects above the plane of the mold surface.

An object of this invention is to produce a machine to remove surplus material from rubber or composition heels, soles and similar articles in molds.

Another object is to provide a machine to trim articles in molds securing uniformity of shape and imparting finish thereto.

Other objects of the invention will more fully appear from the following description and the accompanying drawings and will be pointed out in the annexed claims.

Figure 2:
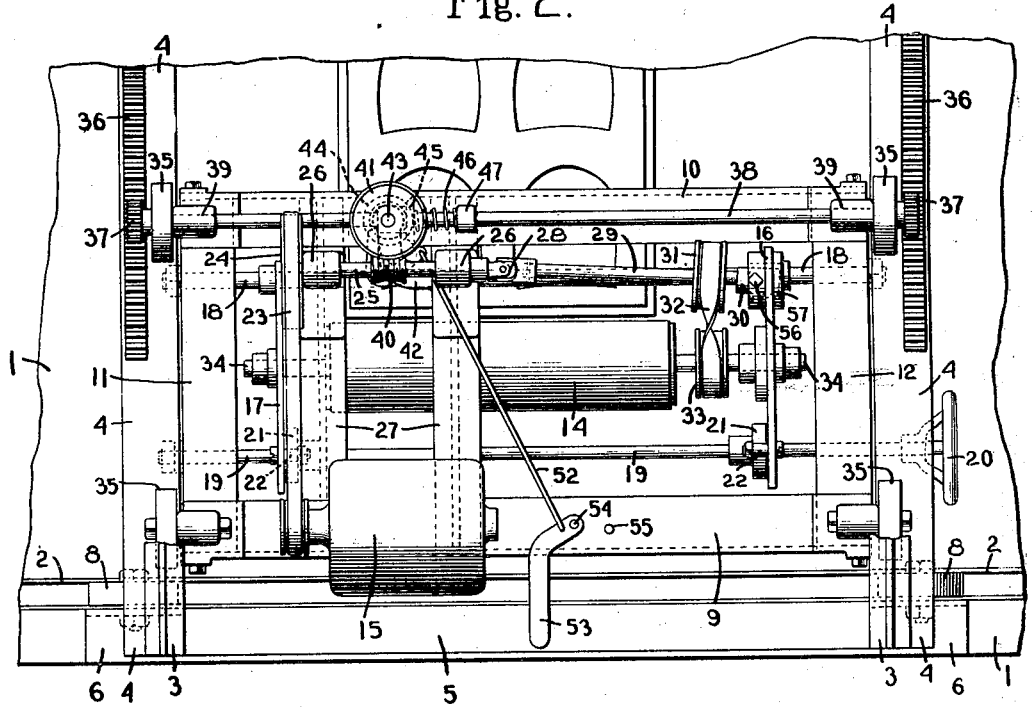

In the drawings, Figure 1 is a front elevation of the machine, part of the frame being in a section on the line 1—1 of Fig. 3, better to show the mechanism; Fig. 2 is a plan view which shows part of the rack; Fig. 3 is a view in side elevation; Fig. 4 is a detail view of the clutch releasing mechanism; Fig. 5 is a diagrammatic view of a heel mold and trimming roller.

In this selected embodiment of this invention, the roller and its actuating mechanism are borne by a carriage which is adapted to traverse the length of a wheeled frame upon which it is mounted. This wheeled frame is in turn adapted to travel upon the table upon which a plurality of molds are placed. For this purpose, the table 1 has two channel rails or tracks 2, one running on each side of the table length. The carriage bearing frame comprises the side rails 3 and 4 which form, in conjunction with the end rails 5 and 6, a substantially rectangular frame. The rails are suitably secured at the corners to standard 7, each of which bears a wheel 8, suitably journaled and adapted to travel in the tracks 2 of the molding table 1.

The carriage bearing the roller consists of a structure having a front rail 9 and rear rail 10 joined by the side rails 11 and 12. These rails are preferably of angle iron secured together at their ends by the braces 13 and forming a rectangle the short sides of which are adjacent the long sides of the frame. The roller 14, which in this selected embodiment has an annular covering of soft rubber in order to afford increased frictional wear when traversing the molded heels, is actuated from a suitable power source, as for example, an electric motor 15 mounted on the front rail 9. The roller 14 has a novel adjustable mounting so that it may be raised from contact with the molds into inoperative position above the table, or, so that when in operative position its tension upon the molds may be increased or decreased accordingly as it is desired to augment or diminish the frictional wear of the roller in trimming, or further to accommodate and compensate for different mold thicknesses. The roller is journaled at each end in the pivoted plates 16 and 17, respectively. These plates are pivotally borne by a bolt 18 which extends the length of the carriage and which is secured to the angle iron rails 11 and 12 at its ends. This plate is moved about its pivot by means of the rod 19 which is rotatably mounted in the rails 11 and 12. The rod 19 is manually operable by means of the hand wheel 20. The plates 16 and 17 are suitably apertured so that the rod 19 may unrestrictedly pass therethrough. The rod 19 bears two especially designed cams 21 fixedly secured to the rod and movable therewith. The cams are placed one each adjacent the plates 16 and 17. Each of the plates bears thereon a pair of studs on which are revolubly mounted the rolls 22 adapted to engage the cams. These rolls 22 are so arranged and the cams 21 are so designed in this preferred embodiment that their axes remain in substantially the same plane as that of the shaft or rod 19 so that, in all positions of adjustment, there will be prevented any tendency of the rolls to cam over the peripheries of the cams 21 and change the roller position. Thus, upon rotation of the rod 19, the cams through the rolls 22 will rock the plates coincidentally about the pivot bolt 18. Such resultant movement functions to raise or lower the plate-borne roller 14.

Power is transmitted from the motor shown by means of a belt 23 running to a pulley 24 which is secured to and is rotatable with a shaft 25. The shaft 25 is journaled above the carriage frame by brackets 26, which are shown in Fig. 2, mounted upon the two angle iron cross rails 27 which are secured to the carriage rails 9 and 10, respectively. The shaft 25, thus rotatable from the driven pulley 24, has affixed thereto a universal joint 28 connecting the shaft 25 and the shaft 29. This shaft has its other end journaled in a box 30 pivotally borne by the set screws 56 carried by the box frame 57. The plate 16 is suitably apertured to receive this frame which extends therethrough and is secured by means of the bolts 58 to the plate 16 so that this shaft 29 may be revolubly borne by the movable pivoted plate 16. The shaft 29 bears thereon and revoluble therewith a pulley 31 which is adapted to actuate, through the intermediary of the crossed belt 32, a pulley 33 affixed to and revoluble with the roller shaft 34 journaled in and carried by the plates 16 and 17.

The carriage bearing the roller and associated mechanism is adapted to be driven under power to traverse the table so that the roller may contact with the heel surfaces presented by the molds. To this end the carriage is mounted upon the wheels 35 journaled at the four corners of the carriage. These wheels bear the weight of the carriage and are adapted to roll upon the side rails 4 of the wheeled frame. These side rails each bear a rack 36 engaged by pinions 37 at each end of the transverse shaft 38 which has suitable bracket journals 39 secured to the rail 10. This shaft 38 is power driven from the same shaft 25 which transmits power to the roller. For this purpose, the shaft 25 has fixedly mounted thereon a worm 40 adapted to mesh with a gear 41 journaled in a bracket 42 secured to one of the cross-rails 27. The shaft 43 of this gear bears at its other end a bevel gear 44 which is adapted to mesh with a similar gear 45 keyed to the shaft 38 which carries the pinions 37. The shaft 38, and hence the pinions 37 are thus driven and the latter, engaging the teeth of the rack 36, function to propel the carriage the rack length. The racks 36 on each side rail do not extend the full length of the rails. At the rear end of the side rails, as shown in Fig. 3, the racks terminate before the end of the side rails. Such construction is provided in order that, just before the completion of a traversal of the carriage, the pinions 37 will run off the racks 36, and turn idly thereafter, so that the propulsive mechanism is thus automatically rendered inoperative. The side rails 3 of the frame are positioned but a short space above the wheels 35, as shown in Fig. 1, so that the pinions may not become disengaged from the toothed rack. It is obvious that by means of the crossed belt 32, the direction of rotation of the roller is opposite to that of the pinions so that increased frictional contact and wear is afforded in the traverse of the roller.

In order that the carriage may be easily returned to starting position for farther traversal of the mold table, a clutch is provided which operates to disengage the bevel gears 44 and 45, disconnecting the power transmission and permitting reverse rotation of the shaft 38. Referring to Fig. 4, the gear 45, keyed on the shaft 38 is normally held in mesh with the gear 44 by means of a coiled spring 46 positioned upon the shaft. One end of the spring bears against a collar 47 fixed on the shaft, while the other end bears against the keyed gear 45 and functions to hold under its tension this gear in engagement with the gear 44. The arm 48 of the bell crank lever 49, pivotally mounted on the carriage structure, impinges against the sleeve 50 preferably integral with the gear 45. The other arm 51 has secured thereto the wire 52 which at its other end is secured to a substantially L-shaped arm 53 pivoted by the pin 54 to the rail 9. The wire 52 is secured to the arm 53 at a point such that, when the arm 53 is turned to impinge against the stop pin 55, in the position shown in dotted lines in Fig. 4, the stress of the wire will be in alinement with the pin 54 and the arm effectually locked against movement.

The operation of this device is simple and it efficiently accomplishes its functions even in the hands of an unskilled operative. The molds containing the formed heels are placed upon the base, which in practice is usually a long table and the molds are arranged in rows so that the trimming roller may traverse a row at a time. The current turned on, the motor on the carriage by means of the belted drive actuates the shaft 25 which rotates, through the universal joint 28, the shaft 29. The crossed belt, running between the pulleys on the shaft 29 and the roller shaft, functions to revolve the roller in a direction reverse to that of the rotation of the motor. Meshing with a worm on the thus driven shaft 25 is a gear which actuates through the intermediary of the disengageable bevel gears 44 and 45, the shaft 38. This shaft bearing on its ends the pinions 37 meshing with the rack 36 functions to drive the carriage the rack length which in practice is sufficiently long to permit the roller to traverse the table width. In this simple, selected embodiment, the carriage is manually returned from its traverse. For this purpose, the arm 53 is turned to impinge against the stop 55. Such movement operates to disengage the gears 44 and 45 so that the pinion driving mechanism may run idly with relation to the power source and the carriage be manually shifted. The carriage may then be returned to normal position ready, upon the shifting of the carriage-bearing frame to present a new path of traverse and the release of the arm 53, to again be actuated to traverse the table width. Upon successive shifts of the frame at each traverse of the carriage, all the mold rows of heels may be trimmed and the superfluous material removed. The roller, in being carried across the table width while revolving in reverse direction, contacts with the surface of the superfluous material of the heels in the molds, and, frictionally rubbing and gripping the same, removes such waste material therefrom. Should increased or lessened contact be required or should it be desired to withhold the roller from contact with the heel molds or heels, the hand wheel 20 may be turned. Such movement operates to shift the cams carried thereon so that the rolls 22, carried on each of the plates 16 and 17, function to rock the pivoted roller-carrying plates so that the roller is elevated or depressed, and the desired frictional contact of the rubber covered roller and the heels obtained.

It is to be understood that the mechanism described herein is illustrative of the preferred embodiment of the invention but that it is in no way restrictive and that the invention contemplates the movement of a trimming mechanism of any type adapted to traverse a series of molds and to be capable of lateral displacement so that the path of traverse may be varied at will.

It will be obvious that the trimming mechanism may, as illustrated, be a rotary member adapted to engage and remove the superfluous material projecting above the upper surface of the mold, and that any suitable cutting, abrading, or other mechanism capable of performing the function stated may be utilized.

Other means from that illustrated may also be used for adjusting the height of the trimming instrumentality to provide for molds of different depths and any suitable mechanism may be employed for propelling the carriage which supports the trimming instrumentality.

It is also within the contemplation of the invention to provide means for automatically causing the carriage to traverse the successive sets of molds in different paths although such automatic mechanism is not described or claimed herein.

Having thus described my invention, what I claim as new and desire to secure by Letters Patent is:

1. A machine for trimming heels and similar articles comprising a base adapted to have a plurality of molds for said articles superposed thereupon, frictional means for trimming the superfluous material and means to support the frictional means whereby the same may traverse the base and trim a plurality of articles.

2. A machine for trimming heels and similar articles comprising a base adapted to have a plurality of molds for said articles superposed thereupon, a movable frame adapted to traverse said base, supporting means carried by said frame and movable transversely with relation thereto, and frictional trimming means for removing the superfluous material carried by said supporting means whereby through suitable movements of said frame and said supporting means a plurality of rows of said articles may be trimmed.

3. A machine for trimming heels and similar articles comprising a base adapted to have a plurality of molds for said articles superposed thereupon, trimming means for removing the suprfluous material from the molded articles, a movable carriage supporting said means, and a frame supporting said carriage, said frame being movable to afford a plurality of paths of traverse of said carriage.

4. A machine for trimming heels and similar articles comprising a base adapted to have a plurality of molds for said articles superposed thereupon, rotatable trimming means adapted to contact with and trim the articles in said molds, a carriage adapted to support said trimming means and actuable to traverse said base, means for actuating said carriage, means for rotating said trimming means in reverse direction to the traverse of the carriage, and a movable frame upon which said carriage travels, said frame being movable on said base to vary the path of traverse of said carriage and trimming means.

5. A machine for trimming heels and similar articles comprising a base adapted to have a plurality of molds for said articles superposed thereupon, a rotatable trimming roller adapted to contact with articles in the molds, a carriage for said roller, means for actuating the carriage and the roller to cause the roller to be rotated and the carriage to traverse said base, and transversely movable means for bearing the carriage whereby upon movement of said last-mentioned means the path of traverse of the roller may be varied.

6. A machine for trimming heels and similar articles comprising a base adapted to have a plurality of molds for said articles superposed thereupon, a carriage adapted to traverse the base, means on the carriage to propel the same, a rotatable trimming instrumentality mounted on the carriage, means for revolving said instrumentality in a direction reverse to that of the carriage movement, whereby the same may engage and trim articles in said molds, and a transversely movable carrier for said carriage whereby the path of traverse of the trimming instrumentality may be varied and a plurality of articles trimmed.

7. A machine for trimming heels and similar articles comprising a base adapted to have a plurality of molds for said articles superposed thereupon, a frame movably mounted on said base, a carriage adapted to travel on and transversely to said frame, racks on said frame, pinions carried by said carriage and engaging said racks, means on said carriage to actuate said pinions whereby said carriage may be caused to traverse said frame, means for disengaging the actuating means, and an article-trimming instrumentality supported by said carriage and adapted thereby to traverse said base and upon movement of said frame to have the path of traverse varied.

8. A machine for trimming heels and similar articles comprising a base adapted to have a plurality of molds for said articles superposed thereupon, movable means for frictionally engaging and thereby trimming articles in said molds, supporting means for said trimming means movable to traverse said base and means for actuating said supporting means and said trimming means.

9. A machine for trimming heels and similar articles comprising a base adapted to have a plurality of molds for said articles superposed thereupon, a frame movably mounted on said base, a carriage actuable to travel on and transversely to said frame, a rotatable member supported by said carriage and adapted to trim articles in said molds, and means on said carriage to actuate said rotatable member and said carriage to cause said member to be rotated and operatively to traverse said molds, the movement of said frame permitting the path of traverse to be varied to trim articles in all said molds.

10. A machine for trimming heels and similar articles comprising a base adapted to have a plurality of molds for said articles superposed thereupon, means adapted upon contact with articles in said molds to trim said articles, means for carrying the trimming means to cause the same to traverse the base and trim a plurality of said articles, and means adjustable to vary the contact tension of said trimming means with the surface to be trimmed.

11. A machine for trimming heels and similar articles comprising a base adapted to have a plurality of molds for said articles superposed thereupon, rotatable means adapted to contact with and thereby to trim the articles in said molds, a carriage actuable to traverse said base, adjustable supports on said carriage for said rotatable trimming means whereby the plane of said contact may be varied, means on said carriage for positioning said supports, means for actuating said carriage, and means on said carriage for operatively actuating said trimming means in the varied positions.

12. In a machine for trimming heels and similar articles having a base for supporting a plurality of molds, an instrumentality for trimming the articles, a carriage and means for actuating the same to cause the article-trimming instrumentality to traverse and engage articles in said molds, a pair of supporting members for said trimming instrumentality pivotally mounted upon said carriage, and means for pivotally adjusting said members whereby the plane of traverse of the instrumentality is adjusted.

13. A machine for trimming heels and similar articles comprising a base adapted to have a plurality of molds for said articles superposed thereupon, rotatable means adapted to contact with and thereby to trim articles in said molds, a carriage actuable to traverse said base, adjustable supports on said carriage for said rotatable trimming means whereby the plane of said contact may be varied, means for actuating said carriage, and compensatory mechanism for operatively actuating the trimming means in said varied positions.

14. In a machine for trimming heels and similar articles having a base for supporting a plurality of molds, an instrumentality for trimming the articles, a carriage and means for actuating the same to cause the trimming instrumentality to traverse and engage articles in said molds, means for adjustably supporting the trimming instrumentality comprising a pair of supporting members for said trimming instrumentality pivotally mounted upon said carriage, a shaft journaled in said carriage, cams on said shaft, oppositely disposed rolls on said pivoted supporting member engaging said cams, the axes of said rolls, and said shaft being in the same plane.

15. In a machine for trimming heels and similar articles having a base for supporting a plurality of molds, an instrumentality for trimming the articles, a carriage and means for actuating the same to cause the trimming instrumentality to traverse and engage articles in said molds, means for adjustably supporting the trimming instrumentality comprising a pair of supporting members for said trimming instrumentality pivotally mounted upon said carriage, a shaft journaled in said carriage, cams on said shaft, oppositely disposed rolls on said pivoted supporting member engaging said cams, and means for actuating the instrumentality including a universal connection for coördinating the driving means to the instrumentality in adjusted positions.

16. A machine for trimming heels and similar articles comprising a base adapted to have a plurality of molds for said articles superposed thereupon, a frame movable longitudinally to traverse the base, a carriage movable transversely with relation to the frame, and trimming means movable on said carriage to trim the articles.

17. A machine for trimming heels and similar articles comprising a base adapted to have a plurality of molds for said articles superposed thereupon, an instrumentality to trim the positioned articles, a carrier for said trimming instrumentality whereby said instrumentality may traverse and trim a number of said articles, and means to afford a different path of traverse to the instrumentality upon the shifting of the carrier whereby another number of said articles are trimmed.

18. A machine for trimming heels and similar articles comprising a base adapted to have a plurality of molds for said articles superposed thereupon, a roller adapted to contact with and thereby to trim the articles, a support for said roller movable to present a series of articles to be trimmed, and means for actuating the roller whereby the roller surface at the trimming contact moves in the opposite direction to the travel of the support.

19. A machine for trimming heels and similar articles comprising a base adapted to have a plurality of molds for said articles superposed thereupon, rotatable frictional means for trimming the superfluous material, means for rotating the frictional means and means to support the frictional means whereby the same may traverse the base and trim a plurality of articles.

20. A machine for trimming heels and similar articles comprising a base adapted to have a plurality of molds for said articles superposed thereupon, a movable frame adapted to traverse said base, supporting means carried by said frame and movable transversely with relation thereto, rotatable frictional means for trimming the superfluous material carried by said supporting means whereby through suitable movements of said frame and said supporting means a plurality of rows of said articles may be trimmed and means for rotating the frictional means.

In testimony whereof, I have signed my name to this specification.

HARRY D. GARBER.

Copies of this patent may be obtained for five cents each, by addressing the "Commissioner of Patents, Washington, D. C."